United States Patent [19]
Kelso

[11] 3,958,428
[45] May 25, 1976

[54] METHOD AND APPARATUS FOR MAKING FROZEN FOOD ARTICLE

[75] Inventor: James W. Kelso, Pacific Palisades, Calif.

[73] Assignees: Joseph M. Yuhasz; Sean A. O'Brien, both of Canoga Park, Calif.

[22] Filed: Aug. 9, 1974

[21] Appl. No.: 496,009

Related U.S. Application Data

[63] Continuation-in-part of Ser. No. 282,913, Aug. 23, 1972, abandoned.

[52] U.S. Cl. .................................. 62/69; 62/342; 62/233; 62/393
[51] Int. Cl.² ................ A23G 9/00; F25D 3/00
[58] Field of Search ............... 62/342, 69, 99, 435, 62/393, 233

[56] References Cited
UNITED STATES PATENTS
2,304,579  12/1942  Lindsey................................ 62/69
2,514,301  7/1950  Tenney............................. 62/342 X

*Primary Examiner*—William E. Wayner
*Attorney, Agent, or Firm*—Allan M. Shapiro

[57] ABSTRACT

Open-ended food freezing chamber has low thermal mass and is unrefrigerated during standby or waiting time. Remote refrigeration source is fast operating with large refrigeration capacity for rapid chamber cooling. Water-containing juice or puree food material is deposited on the walls of the chamber after the chamber is cooled. The resulting frozen material is scraped off into a receiver. Thereupon refrigeration ceases and the chamber rises to ambient to permit the remaining food material to thaw and drain and to prevent the formation of rime ice.

13 Claims, 1 Drawing Figure

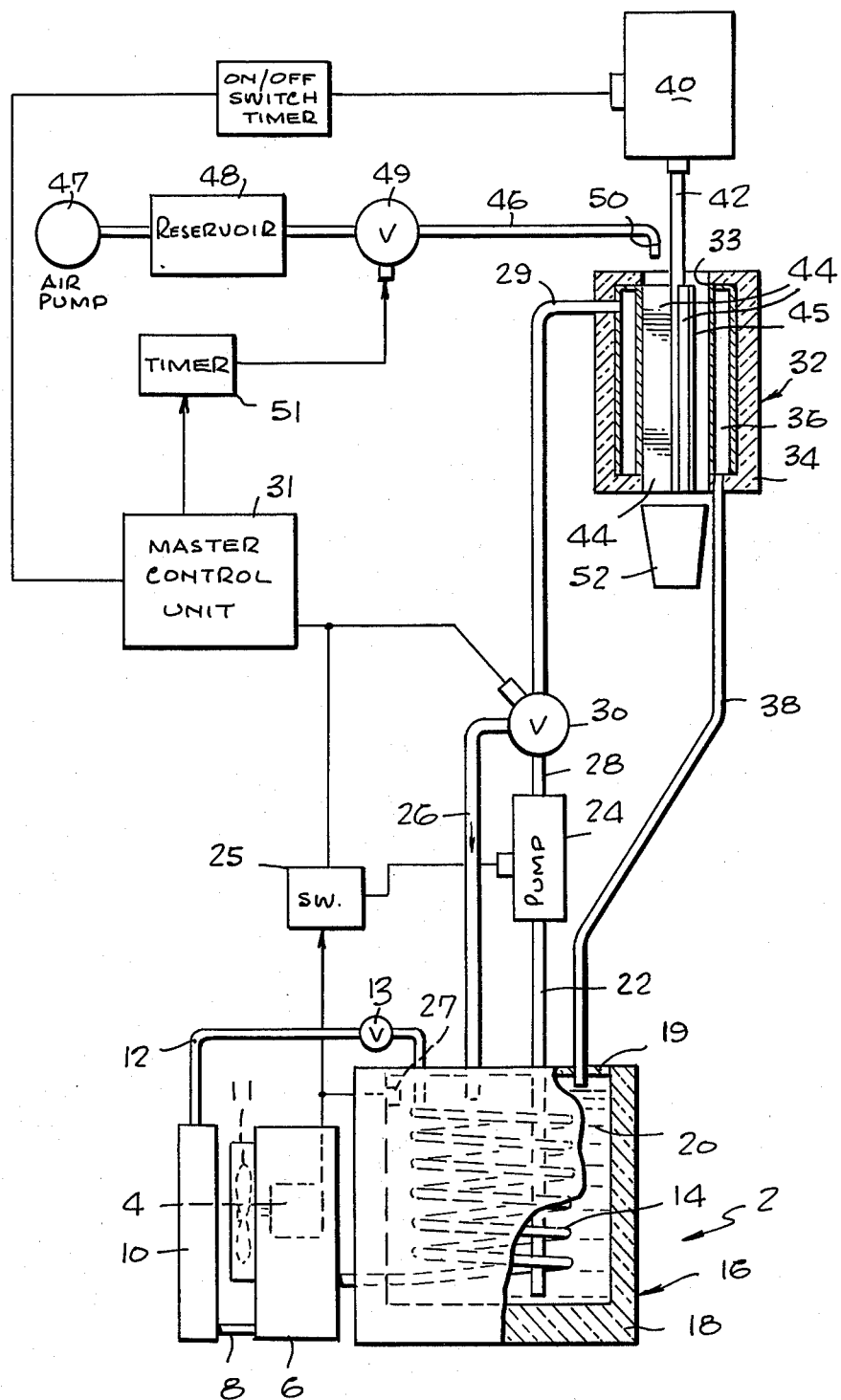

METHOD AND APPARATUS FOR MAKING FROZEN FOOD ARTICLE

CROSS REFERENCE

This application is a continuation in part of the prior application by James W. Kelso, Ser. No. 282,913, now abandoned, filed Aug. 23, 1972, for method and apparatus for cooling an article.

BACKGROUND OF THE INVENTION

1. Field of the Invention

This invention is directed to a method and apparatus for making a frozen food article, and particularly an apparatus which is maintained in a ready state for freezing, without having the freezing chamber at reduced temperature to prevent retention of portions of prior frozen food and to prevent the formation of rime ice.

2. Brief Description of the Prior Art

The conventional refrigerating or freezing device comprises a compressor which compresses a refrigerant gas such as Freon, ammonia or nitrogen which is then expanded into an evaporator to allow the fluid to expand and evaporate and in so doing absorb heat whereby an article may be cooled or frozen. This fluid is then again compressed and condensed and the cycle is repeated. In some cases, a container is surrounded by coils or is submerged in a liquid which has been cooled by a refrigerating apparatus so that an article placed in the container is either cooled or frozen. An example is seen in the U.S. Pat. to Spreen, No. 1,764,653. In this patent there is disclosed a refrigerating system which includes a compressor and an evaporator which is immersed in a liquid. Also, submerged in this liquid are containers into which articles to be cooled can be placed and maintained in a cooled or frozen state. Another example is seen in the U.S. Pat. to O'Neil, et al., No. 2,058,098. This patent shows a refrigerating and dispensing system whereby the evaporating coils surround a soda dispenser to cool the beverages so that upon demand the beverages may be dispensed into such containers as paper cups and the like.

In the U.S. Pat. to Palmer, No. 3,041,852, there is disclosed a refrigerating apparatus which is contained in one unit whereby the coolant is transferred via a coil to a separate container which, in the example shown, is a garbage container. Thus, a compressor and evaporative unit is contained in one unit and a separate container to receive the evaporative coolant is utilized to cool an article contained therein.

As will appear from the further portions of this specification, this prior art is not directly pertinent, but is generally directed to refrigeration systems for food materials. In addition, Ash U.S. Pat. No. 2,590,061 discloses a system wherein a fluid is maintained at a relatively constant temperature for dispensing to and cooling a remote vat but this fluid is not recirculated back to the reservoir, because the fluid is not a coolant. Bright U.S. Pat. No. 2,040,828 is similar to Ash, but it must be noted that the volumetric capacity of Bright's fermentation tank is substantially greater than the volumetric capacity of his cooling apparatus, which is largely opposite from the teaching set forth below. Furthermore, while Haley U.S. Pat. No. 2,720,084 employs a separate refrigerator for chilling a circulating coolant, the coolant is for air conditioning service and there is no teaching of a particular type of food freezing chamber.

SUMMARY OF THE INVENTION

This invention is characterized by a refrigerating unit which cools a coolant in a coolant chamber of large thermal capacity. An open-ended food freezing chamber of low thermal capacity is at ambient temperature at standby but, when food freezing is desired, the coolant is circulated through coolant space in the chamber to rapidly chill the chamber. After the food is frozen, the coolant is drained from the cooling space to permit the chamber to return to ambient temperature.

It is thus an object of this invention to provide both a method and apparatus for making a frozen food article, where the frozen food chamber is open at the end and where it is supplied with a coolant when it is required, and is permitted to remain at ambient temperature when cooling is not required, to prevent the buildup of rime ice during idle periods. It is a further object to provide a method and apparatus for making a water-containing frozen food article from fruit or vegetable juice, or from fruit or vegetable puree to result in a comestible in chilled whipped slush form for ease and desirability of consumption. It is yet another object to provide a method and apparatus for making a frozen food slush edible which is satisfactory for use as the operative element of an automatic dispensing machine for such a food product, which is capable of periods of non-operation without objectionable results.

The features of the present invention which are believed to be novel are set forth with particularity in the appended claims. The present invention, both as to its organization and manner of operation, and together with further objects and advantages thereof may be understood best by reference to the following description taken in connection with the accompanying drawings.

BRIEF DESCRIPTION OF THE DRAWING

The single FIGURE of the drawing is a side elevational view of the apparatus, somewhat schematically arranged, and with parts broken away and parts shown in section, together with a schematic layout of the control system whereby the various portions of the apparatus are controlled.

DESCRIPTION OF THE PREFERRED EMBODIMENT

The refrigeration unit is generally indicated at 2 in the drawings. Refrigeration unit 2 includes motor 4 which operates compressor 6 and fan 11. The compressor delivers high pressure refrigerant gas through conduit 8 to condenser 10. Heat is rejected to the atmosphere from the condenser, particularly aided by air circulation thereover induced by fan 11. The refrigerant gas is condensed to refrigerant liquid in condenser 10 and the liquid is delivered through high pressure liquid line 12 to expansion valve 13. The liquid is expanded to lower pressure and evaporates to a gas in evaporator coils 14, with a reduction in temperature and consequent receipt of heat from the region outside of evaporator coil 14. The warmed low pressure refrigerant gas is connected to the suction of compressor 6 to complete the refrigerant cycle. This type of conventional refrigerator often has a thermostatically controlled expansion valve 13 which is responsive to the temperature surrounding evaporator coils 14. In such a case, the cycling of the compressor is pressure controlled, so that high pressure refrigerant liquid is always available as refrigeration need occurs.

Refrigerator unit 2 is a conventional cooling refrigerating apparatus in which the compressor compresses the refrigerant fluid which is then condensed, and then the high pressure refrigerant liquid is expanded into the exaporator coil to receive the heat contained in the coolant 20 around the evaporator coil. When coolant 20 has a freezing point below 32°F, such as ethylene glycol or a mixture of ethylene glycol and water, the coolant 20 can be cooled to a temperature below 32°F, for example −10°F or lower. A half and half mixture of ethylene glycol and water is preferred as coolant 20, but other liquid coolants capable of effectively operating in the −10°F range are also satisfactory. Container 16 contains the coolant and includes thermal insulation 18 to minimize the gain of heat into coolant 20 through the walls of container 16. The container may have a cover 19 to minimize thermal convective losses from the top surface of the coolant.

Coolant circulating pump 24 takes suction by intake line 22 from the bottom of coolant 20. Pump 24 discharges into outlet conduit 28, which is connected to three-way valve 30. One of the outlets from three-way valve 30 is through return or recirculating conduit 26 which returns the pump coolant back to container 16. Switch 25 controls the electric motor which drives pump 24. Temperature sensor 27 senses the temperature of the coolant in container 16 and, when the temperature rises substantially above the normal temperature of coolant 20, then both the refrigeration motor 4 of refrigeration unit 2 and the pump 24 turn on, with valve 30 in the recirculating position. For example, if a normal temperature of coolant 20 is −10°F, then the pump can turn on when the temperature sensor 27 detects a local temperature at that point above −5°F. The pump thus pumps and recirculates the coolant 20 to keep line 22, pump 24, line 28 and valve 30 chilled, as well as to prevent thermal stratification of the coolant in container 16. Of course, the coolant handling parts are preferably insulated to conserve refrigeration. The refrigeration unit 2 and pump 24 run until temperature sensor 27 is satisfied.

Three-way valve 30 is preferably the solenoid-actuated type and is controlled by master control unit 31. When actuated, valve 30 connects valve inlet line 28 to outlet coolant line 29. Furthermore, master control unit 31 is also connected to switch 25 so that when valve 30 is actuated to discharge into line 29, the pump 24 is always operative. Thus, when valve 30 is actuated, the thermal control of switch 25 from temperature sensor 27 is overridden, and pump 24 runs continuously as described in the operational sequence below.

Food freezer 32 is open-ended, top and bottom, and has cylindrical freezing walls 33 therein. Annular coolant chamber 36 surrounds the freezing walls 33. Thermal insulation 34 surrounds the outside of the annular coolant passage 36 to minimize thermal loss. Coolant line 29 is connected to the top of passage 36 and return conduit 38 is connected to the bottom of passage 36. It is thus seen that, with pump 24 on and with valve 30 open to line 29, coolant 20 circulates through annular coolant chamber 36 and flows back to container 16 through return conduit 38. The volume of annular coolant chamber 36 is very small as compared to the volume of container 16, for example about 1/64 of the volume. Also, walls 33 are thin so that there is very low heat capacity in food freezer 32. If freezer 32 starts at ambient temperature, from the beginning of circulation of coolant 20 through annular coolant passage 36, it is only a very short time, e.g., less than three seconds, until the walls 32 are sub-freezing. The large volume of chilled coolant, its fast circulation, and the low thermal mass of freezer 32 provide fast cooldown. Freezer 32 is positioned above container 16 so that when the pump stops, chamber 36 quickly gravity drains.

Motor 40 is mounted so that its shaft 42 extends into the freezing chamber defined interiorly of freezing walls 33. Three beater-scraper blades 44 are mounted on shaft 42 and engage substantially against the circular walls 33. Blades 44 are straight axially along the length of shaft 42, but have angularly notched edges 45 which serve to advance frozen material downwardly along the freezing walls 33. Cup 52 is positioned below the open lower end of the interior freezing chamber defined by walls 33. Motor 40 is controlled from master control unit 31.

Reservoir 48 contains the food product to be frozen. The food product contains water, and it may be a juice of fruits or vegetables. Furthermore, it may be a puree of fruits or vegetables, containing some fruit pulp. It is a sufficiently liquid fluid to be able to be pumped and sprayed. Juices of tree fruits, berries, and other fruits, as well as vegetables and purees thereof, are suitable materials to serve as a liquid starting material for the frozen food article. Any convenient means can be employed to spray the food material from nozzle 50 onto the walls 33. Conveniently, air compressor 47 pressurizes reservoir 48 and, upon opening of valve 49, the liquid food product is delivered under pressure through line 46 to nozzle 50. The nozzle delivers the fluid to walls 33 as a thin liquid layer which is frozen and then processed by the scrapers.

In considering the operation, pump 24 operates on a thermostatic cycling basis to maintain coolant 20 circulated to prevent thermal stratification in container 16, to keep lines 22 and 28 cool, and to keep pump 24 and valve 30 cool. The coolant 20 is maintained at −10°F or below. When a frozen food article is desired, the cycle is initiated at master control unit 31. The initiation can be by way of deposit of a coin in the mechanism, when the apparatus is a coin dispenser. Otherwise, it is simply a start cycle button. At the start cycle, valve 30 is actuated to discharge coolant into line 29, pump 24 is continuously operated and a 2 to 3 second time delay is held before spraying of the liquid food material to permit the chamber walls 33 to be properly chilled. Due to the low heat capacity of food freezer 32, chilling is quickly accomplished. Whipper motor 40 can be started at the start cycle or can wait until the beginning of the liquid spraying portion of the cycle. The whipper scraper blades 44 rotate at a sufficiently high speed to ship the food material and entrap air therein. Valve 49 is opened, when timer 51 is started by master control unit 31, to permit reservoir 48 to discharge the liquid food material out of nozzle 50. Solenoid-actuated valve 49 remains open a predetermined length of time, controlled by timer 51, to permit spraying of a desired quantity of liquid food material. While other quantity measuring means are conceivable, a time-operated valve in conjunction with a pressurized reservoir feeding the nozzle provides sufficient accuracy of liquid food material dispensing. The liquid food material spray rate out of nozzle 50 is such that the freezing chamber is not completely filled. Air is always present so that the high speed whipper-scrapers 44 whip and aereate the liquid as it is frozen. A speed of 1000 rpm of the whipper-scrapers is suitable with most food materials. The high refrigeration capacity supplied from container 16 coupled with the small volume and low thermal mass of food freezer 32 permits continuous freezing of the liquid food material, while it is beaten and scraped. Scraping moves the whipped and frozen food material down into cup 52.

With the cup still in place, coolant valve 30 is switched to recirculate the coolant down return line 26, and the annular coolant chamber 36 quickly gravitationally drains down return conduit 38 so that no more refrigeration is supplied to food freezer 32. The low thermal capacity now permits the interior of the food freezer to quickly warm up. With the whipper-scraper rotating and the cup in place, any of the frozen material which has been retained on the walls is released and runs down into the cup, for self-cleaning. Finally, the whipper scraper is turned off and cup 52 is removed. The complete cycle for producing the frozen food article is in order of seconds rather than minutes so that it is convenient to operate as a coin operating dispensing device.

With the food freezer 32 now warmed up, rime ice does not form so that there is no rime ice contamination of the next made article, and there is no rime ice formation to freeze the blades 44 in place. Accordingly, the freezing chamber remains clean and ready for the next operation.

This invention having been described in its preferred embodiment, it is clear that it is susceptible to numerous modifications and embodiments within the ability of those skilled in the art and without the exercise of the inventive faculty. Accordingly, the scope of this invention is intended to be defined by the scope of the following claims.

What is claimed is:

1. An apparatus for intermittently operating a dispensing container at below freezing temperatures comprising, in combination:

a reservoir;

a chilled coolant fluid normally contained in said reservoir;

conventional refrigeration means in heat exchange relationship with said coolant fluid for maintaining said coolant fluid at a first temperature substantially below the freezing point of water;

a dispensing container remote from said reservoir for intermittently receiving and dispensing a water-containing substance, said container being provided with a circulant coolant passage, said passage having a volumetric capacity substantially less than the quantity of coolant fluid in said reservoir;

conduit means in communication between said reservoir and said passage for conveying said coolant fluid therebetween, said conduit means including pump means, and selectively operably valve means to commence and terminate flow of coolant fluid to said passage;

selectively operable means for intermittently providing said remote dispensing container with said water-containing substance, and dispensing such substance from said container after cooling thereof; and means for coordinating the intermittent operation of said valve and said dispensing container so that said coolant fluid is supplied to said passage only during the period of time the water-containing substance is in said container.

2. An apparatus as defined in claim 1 wherein:
said circulant coolant passage is annular and surrounds said container, and
said coolant flows from said passage into said conduit means at a bottom end of said passage whereby, upon said termination of flow of coolant fluid to said passage, any of said coolant remaining in said passage is gravity drained therefrom for terminating the cooling effect thereof.

3. An apparatus for making a frozen food article comprising:
a frozen food article freezing and dispensing chamber of low thermal mass having walls on which the frozen food article can be frozen;
means for dispensing water-containing frozen food liquid onto said chamber walls;
whipper-scraper means for whipping the frozen food article as it freezes on said walls and scraping it off said walls and dispensing the frozen food article;
refrigeration means for refrigerating said walls, said refrigeration means including a separate container of high thermal mass of chilled coolant which can be controllably discharged behind said walls for refrigerating said freezing chamber walls; and
control means for maintaining said freezing chamber at ambient temperature during standby periods and for circulating coolant behind said walls upon demand for a frozen food article, with operation of said whipper-scraper means and with supplying of liquid food material to said walls subsequent to the beginning of circulation of coolant to said walls.

4. The apparatus of claim 3 comprising:
a pump connected to circulate said coolant, said pump selectively, discharging chilled coolant to said walls;
said food freezer being positioned above said coolant container; and
a coolant return line for gravitationally draining coolant back to said container.

5. The apparatus of claim 4 comprising:
a recirculating valve positioned at the discharge of said pump, said valve having an outlet to said food freezer and having an outlet to said coolant container so that, upon operation of said pump, said valve can return coolant directly to said coolant container to circulate said coolant and chill said pump and said valve.

6. The apparatus of claim 5 comprising:
a thermostat at said pump, said thermostat controlling pump operation, and
said control means controls said valve and also controls said pump.

7. The apparatus of claim 3 comprising:
said freezing chamber walls being cylindrical with the axis thereof positioned away from the horizontal for gravitational discharge of the frozen food article, said cylindrical chamber being open ended.

8. The apparatus of claim 7 comprising:
an annular coolant chamber positioned behind said walls for receiving said coolant when refrigeration of said walls is desired;
said food freezer is positioned above said coolant container; and
a gravitational return line for returning coolant from said annular coolant chamber to said coolant container.

9. A process for intermittently operating a dispensing container at below freezing temperature, comprising:
   maintaining a coolant fluid in a reservoir having a first volumetric capacity at a temperature substantially below the freezing point of water;
   providing a dispensing container with a coolant passage having a second volumetric capacity substantially less than said first volumetric capacity;
   intermittently providing said dispensing container with a water-containing substance; and
   supplying and circulating the coolant fluid between said reservoir and said passage in heat exchange relationship with said dispensing container only in immediate anticipation of and during the period of time the water-containing substance is in said container for enhanced rapidity of cooling during the cooling period and for elimination of rime ice formation on the dispensing container during non-cooling periods.

10. The process of claim 9 further including:
   the step of whipping and scraping the water-containing substance as it freezes in said dispensing container to disperse the whipped and frozen water-containing substance from the dispensing container.

11. The process of claim 10 wherein:
   the termination of the production of the frozen water-containing substance is accomplished by first terminating the providing of the water-containing substance, then terminating the circulation of coolant fluid and finally, after the dispensing container has reached a temperature above the freezing point of water, terminating the action of the whipper-scraper.

12. The process of making a frozen food article in a food freezing chamber which is maintained at above freezing temperatures during standby periods comprising the steps of:
   supplying and circulating a coolant fluid at a temperature below the freezing point of water through a coolant fluid path in said food freezer from a source of coolant fluid having a greater thermal mass than said food freezer to quickly reduce the temperature of the food freezer below the freezing point of water;
   allowing the food freezer walls to reach a sub-freezing temperature;
   placing water-containing liquid food on the walls of said food freezer; and
   operating a whipper-scraper adjacent to the walls of the food freezer to whip the water-containing food substance as it freezes and scrape it from the walls to dispense the frozen food article from the food freezer.

13. The process of claim 12 wherein the process of producing the frozen food article is terminated by the steps of:
   terminating supply of the water-containing liquid food to the walls of the food freezer;
   terminating supply of the coolant fluid to the walls of the food freezer so that the wall temperature rises above the freezing point of water and remaining food substance is permitted to gravitationally drain from the walls; and
   terminating action of the whipper-scraper.

* * * * *